United States Patent [19]

Hayashi

[11] Patent Number: 5,032,750

[45] Date of Patent: Jul. 16, 1991

[54] ABSOLUTE ROTATION POSITION DETECTOR WITH COAXIAL RESOLVERS

[75] Inventor: Yasukazu Hayashi, Ooguchi, Japan

[73] Assignee: Kabushiki Kaisha Okuma Tekkosho, Aichi, Japan

[21] Appl. No.: 539,745

[22] Filed: Jun. 18, 1990

[30] Foreign Application Priority Data

Jun. 27, 1989 [JP] Japan .................................. 1-164266

[51] Int. Cl.$^5$ ...................... H02K 24/00; G01B 7/30; G01D 5/04
[52] U.S. Cl. .................................. 310/83; 310/68 B; 310/114; 341/112
[58] Field of Search ...................... 310/68 B, 49 R, 83, 310/90, 114, 162, 166, 168; 318/721; 324/207.17, 207.25; 341/112, 113

[56] References Cited

U.S. PATENT DOCUMENTS 4,733,116  3/1988  Schulz ................................ 341/112

Primary Examiner—Steven L. Stephan
Assistant Examiner—D. L. Rebsch
Attorney, Agent, or Firm—Wenderoth, Lind & Ponack

[57] ABSTRACT

An absolute position detector for detecting an absolute position of a rotating shaft (1) includes a rotatable shaft and first gearing for operatively coupling the rotating shaft to the rotatable shaft (3a). Resolvers are provided, each having a stator and a rotor. The stator includes pole teeth made of a magnetic material and arranged along an outer circumference of the rotating shaft at a distance from the rotating shaft. The rotor includes a rotor made of a magnetic material respectively associated with pole teeth and located between the rotating shaft and pole teeth. Second gearing operatively couples the rotor of the resolvers to the rotatable shaft. Upon a rotation of the rotating shaft, the first gearing causes the rotatable shaft to rotate, and upon a rotation of the rotatable shaft, the second gearing (14 and 15) causes the rotor of each of the resolvers, at incrementally different gear ratios, to vary reluctance of a magnetic circuit formed by the pole teeth of an associated stator portion.

3 Claims, 9 Drawing Sheets

ABSOLUTE ROTATION POSITION DETECTOR WITH COAXIAL RESOLVERS

BACKGROUND OF THE INVENTION

The present invention relates to an absolute position detector for detecting the absolute position of a rotation shaft.

Conventionally, an absolute position detector including reduction gearing and a plurality of resolvers is miniaturized by installing the resolvers on an input shaft.

FIG. 1A is an axial cross section view showing an embodiment of an absolute position detector proposed by the same applicant. FIG. 1B is a cross section view taken along line I—I of FIG. 1A.

As shown in FIG. 1A, the input shaft 1 of the absolute position detector is installed through bearings 63, 64 which are housed a casing 61 of a flange 60. A gear 10 is fitted to the input shaft 1. A reduction gear system is provided in such a manner that the rotation of a gear 11 engaged with the gear 10 causes a gear 12 fitted to a shaft 2 of a gear 11 to rotate. The rotation of a gear 13 engaged with the gear 12 causes gears 14 and 15, both being fitted to a shaft 3b of the gear 13, to rotate. The rotation of the gear 13 further causes gears 16b and 17b, respectively engaged with the gears 14 and 15, to rotate. By this reduction gear system, a cylindrical output shaft 4 fitted to the gear 16b rotates one turn for every twenty four rotations of the input shaft 1, while a cylindrical output shaft 5 fitted to the gear 17b rotates one turn for every twenty five rotations of the input shaft 1.

A rotor 73 is attached to the input shaft 1 with the aid of a key 76 and a rotor 74 is attached to the output shaft 4 with the aid of a key 77b. Further, a rotor 75 is attached to the output shaft 5 with the aid of a key 78b. Stators 70, 71, 72 corresponding to the rotors 73, 74 75 are fixed to the casing 61. The stators 70, 71, 72 and the rotors 73, 74, 75 are made of a magnetic material. The rotors 73, 74, 75 are cylindrically shaped and are attached to the shafts 1, 4, 5 respectively so as to revolve eccentrically relative to the rotation centers of the shafts 1, 4, 5. Each of the stators 70, 71, 72 has four pole teeth and primary windings 84, 85, 86 for providing exciting pulses are wound around the four pole teeth of the respective stator. If the three pole teeth arranged in the axial directions of the stators 70, 71 72 are regarded as one set of pole teeth, secondary windings 80, 81, 82, 83 for outputting amplitude modulation waves are wound around four sets of the pole teeth respectively. Two sets of the secondary windings 80, 82 and 81, 83 are connected in series to each other. By this arrangement, when one of the primary windings 84, 85, 86 is pulse-excited, a pulse voltage is output from the both edges of two sets of the secondary windings 80, 82 and 81, 83 by a reluctance difference between a rotor in response to a excited stator and the four excited pole teeth. The pulse voltage is amplitude-modulated to sine and cosine values of a rotor rotation angle corresponding to an excited stator.

FIG. 2 is a block diagram showing the absolute position detector shown in FIG. 1 and an embodiment of its encoding circuit. The components in FIG. 2 which are the same as those in FIG. 1 are denoted by the same reference characters and the explanations thereof are omitted. Resolvers 20, 21, 22 in FIG. 2 respectively correspond to resolvers which are made up of the stator 70 and the rotor 73 the stator 71 and the rotor 74 and the stator 72 and the rotor 75 shown in FIG. 1.

Pulse excitation signal generators 30, 31, 32 sequentially pulse-excite the primary windings 84, 85, 86 of resolvers 20, 21, 22 according to pulse excitation signals $P_{ex0}$, $P_{ex1}$, $P_{ex2}$ based pulse excitation signals Pex 0, Pex 1, Pex 2 based on timing signals $P_0$, $P_1$, $P_2$ from a timing controller 42. For this reason, pulse signals S, C are sequentially outputted to the secondary windings 80, 82 and 81, 83 for outputting the amplitude modulation signal, the secondary windings 80, 82 and 81, 83 being shared by the resolvers 20, 21, 22. The pulse signals S, C are amplitude-modulated to the sine and cosine values of the rotor rotation angle of the excited resolver and are further inputted to A/D converters 40, 41. The A/D converters 40, 41 convert two types of pulse signals S and C by a conversion start signal $C_{start}$ from the timing controller 42 into numerical values and output the pulse signals as sine signal $D_s$ and cosine signal $D_c$. The sine signal $D_s$ and the cosine signal $D_c$ outputted from the A/D converters are inputted to a microcomputer 50. Timing signal $t_1$ from the timing controller 42 allows the microcomputer 50 to determine which resolver the signals come from. Furthermore, the microcomputer 50 computes the following equation (1). However, since the rotation direction of the rotors of the resolvers 21, 22 is opposite to that of the input shaft 1, the microcomputer 50 computes equation (1) after the sine signal $D_s$ and the cosine signal $D_c$ are converted to determine rotor rotation angles $\theta_{21}$, $\theta_{22}$.

$$\begin{aligned}
&\text{when } D_s \geq 0 \text{ and } D_c \geq 0 \text{ and } D_s \leq D_c, \\
&\theta = 256 \times (\tan^{-1}(D_s/D_c)/2\pi) \\
&\text{when } D_s \geq 0 \text{ and } D_c \geq 0 \text{ and } D_s > D_c, \\
&\theta = 64 - 256 \times (\tan^{-1}(D_c/D_s)/2\pi) \\
&\text{when } D_s \geq 0 \text{ and } D_c < 0 \text{ and } D_s \geq -D_c, \\
&\theta = 64 + 256 \times (\tan^{-1}(-D_c/D_s)/2\pi) \\
&\text{when } D_s \geq 0 \text{ and } D_c < 0 \text{ and } D_s < -D_c, \\
&\theta = 128 - 256 \times (\tan^{-1}(-D_s/D_c)/2\pi) \\
&\text{when } D_s < 0 \text{ and } D_c < 0 \text{ and } -D_s \leq -D_c, \\
&\theta = 128 + 256 \times (\tan^{-1}(D_s/D_c)/2\pi) \\
&\text{when } D_s < 0 \text{ and } D_c < 0 \text{ and } -D_s > -D_c, \\
&\theta = 192 - 256 \times (\tan^{-1}(D_c/D_s)/2\pi) \\
&\text{when } D_s < 0 \text{ and } D_c \geq 0 \text{ and } -D_s \geq D_c, \\
&\theta = 192 + 256 \times (\tan^{-1}(-D_c/D_s)/2\pi) \\
&\text{when } D_s < 0 \text{ and } D_c \geq 0 \text{ and } -D_s < D_c, \\
&\theta = 256 - 256 \times (\tan^{-1}(-D_s/D_c)/2\pi)
\end{aligned} \quad (1)$$

By the above-described process, data $\theta_{20}$, $\theta_{21}$, $\theta_{22}$, corresponding to the rotor rotation angles of the resolvers 20, 21, 22, is obtained. The microcomputer 50 further computes the following equation (2) to determine $\theta'$.

$$\theta' = \theta_{20} + 256 \times ((24 \times \theta_{21} - \theta_{20} + 128)/256) \quad (2)$$

The above equation (2) is computed using only integers.

As shown in FIG. 3, the determined $\theta'$ can be represented by any number from 0 to 6143, and denotes the rotation angle of twenty four rotations of the input shaft 1.

The microcomputer 50 then computes the following equation (3) to determine $\theta''$.

$$\begin{aligned}
&\text{when } \theta' - 25 \times \theta_{22} + 127 \geq 0, \\
&\theta'' = \theta' + 6144 \times ((\theta' - 25 \times \theta_{22} + 128)/256) \\
&\text{when } \theta' - 25 \times \theta_{22} + 128 < 0, \\
&\theta'' = \theta' + 6144 \times ((\theta' - 25 \times \theta_{22} + 6528)/256)
\end{aligned} \quad (3)$$

The above equation (3) is computed using only integers.

As shown in FIG. 4, the determined $\theta''$ can be represented by any number from 0 to 153,599, and denotes the rotation angle of six hundred rotations of the input shaft 1. If necessary, reference is made to Japanese Patent Application No. 63-163049.

Such a conventional absolute position detector as described above requires much space among the rotors of the resolvers in order to avoid magnetic interference between the adjacent resolvers. Furthermore, concentrically circular cylindrically output shafts are required for each rotor, because the rotor rotation ratios with respect to the input shaft of the resolvers arranged on the same axis are different. Therefore, the conventional absolute position detector has a disadvantage in that it is large.

SUMMARY OF THE INVENTION

In the light of the above-described disadvantage, it is an object of the present invention to provide a miniaturized and simply structured absolute position detector.

According to an aspect of this invention, for achieving the object described above, there is provided an absolute position detector which includes a reduction gearing and a plurality of resolvers, wherein the resolvers, each of which includes a stator having a plurality of magnetic pole teeth on its circumference and which includes a rotor having a portion made of magnetic material for varying, in response to the rotation displacement of a shaft, the reluctance of a magnetic circuit formed by the magnetic pole teeth, are arranged on a same axis, and a first gear made of non-magnetic material is in contact with at least one of the portions made of magnetic material of the rotor, and the shaft of a second gear engaged with the first gear is arranged so as to run through the space between the pole teeth on the circumference of the stator.

The nature, principle and utility of the invention will become more apparent from the following detailed description when read in conjunction with the accompanying drawings.

DESCRIPTION OF THE PREFERRED EMBODIMENTS

Figure 1A:
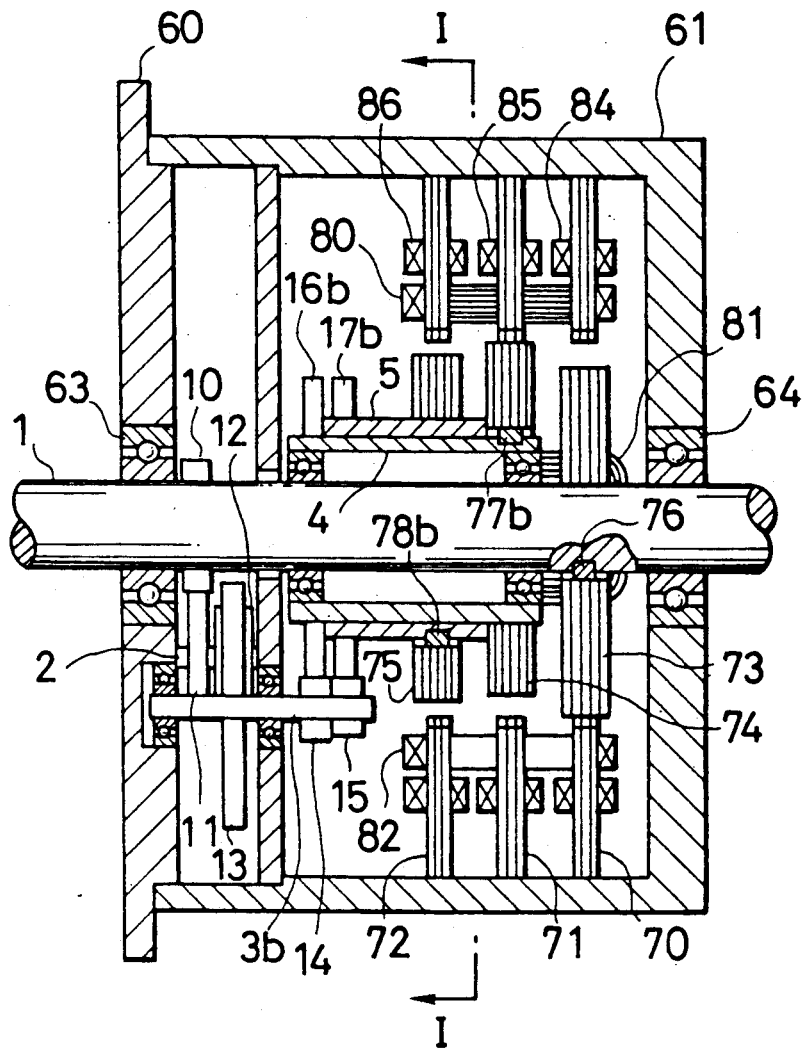
FIG. 1A is an axial cross section view showing an embodiment of the conventional absolute position detector.
Figure 1B:
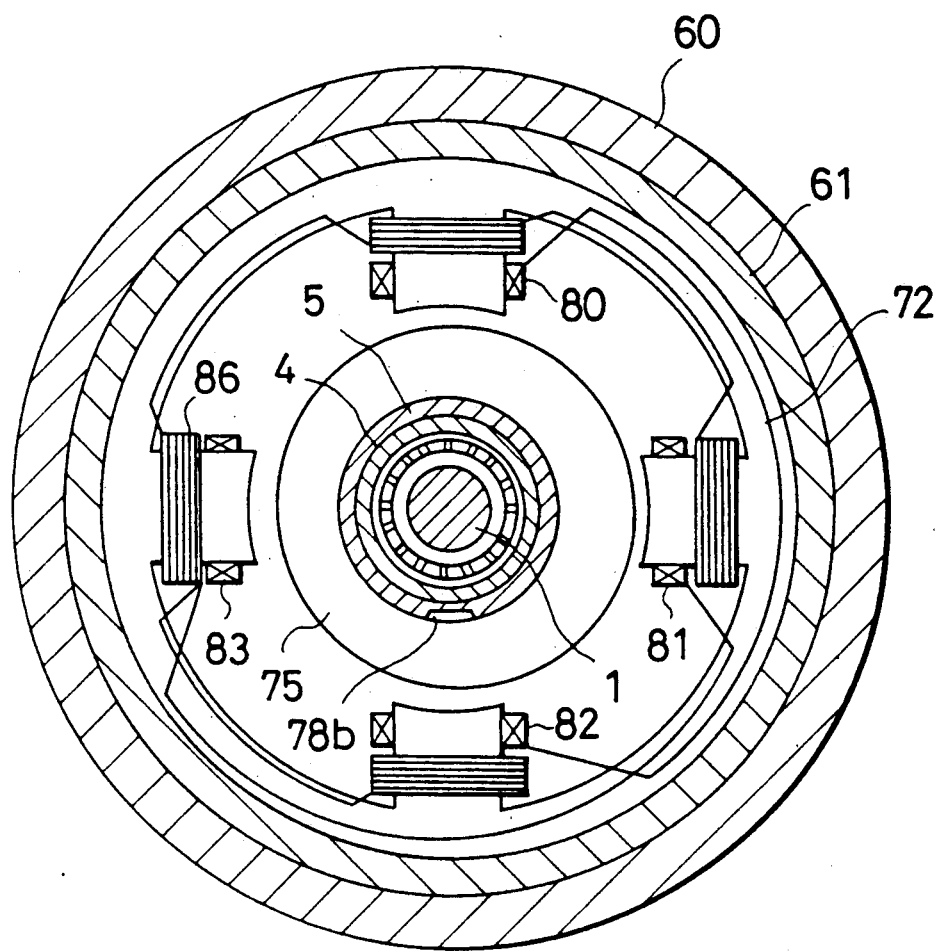
FIG. 1B is a cross section view taken along line I—I of FIG. 1A.
Figure 2:
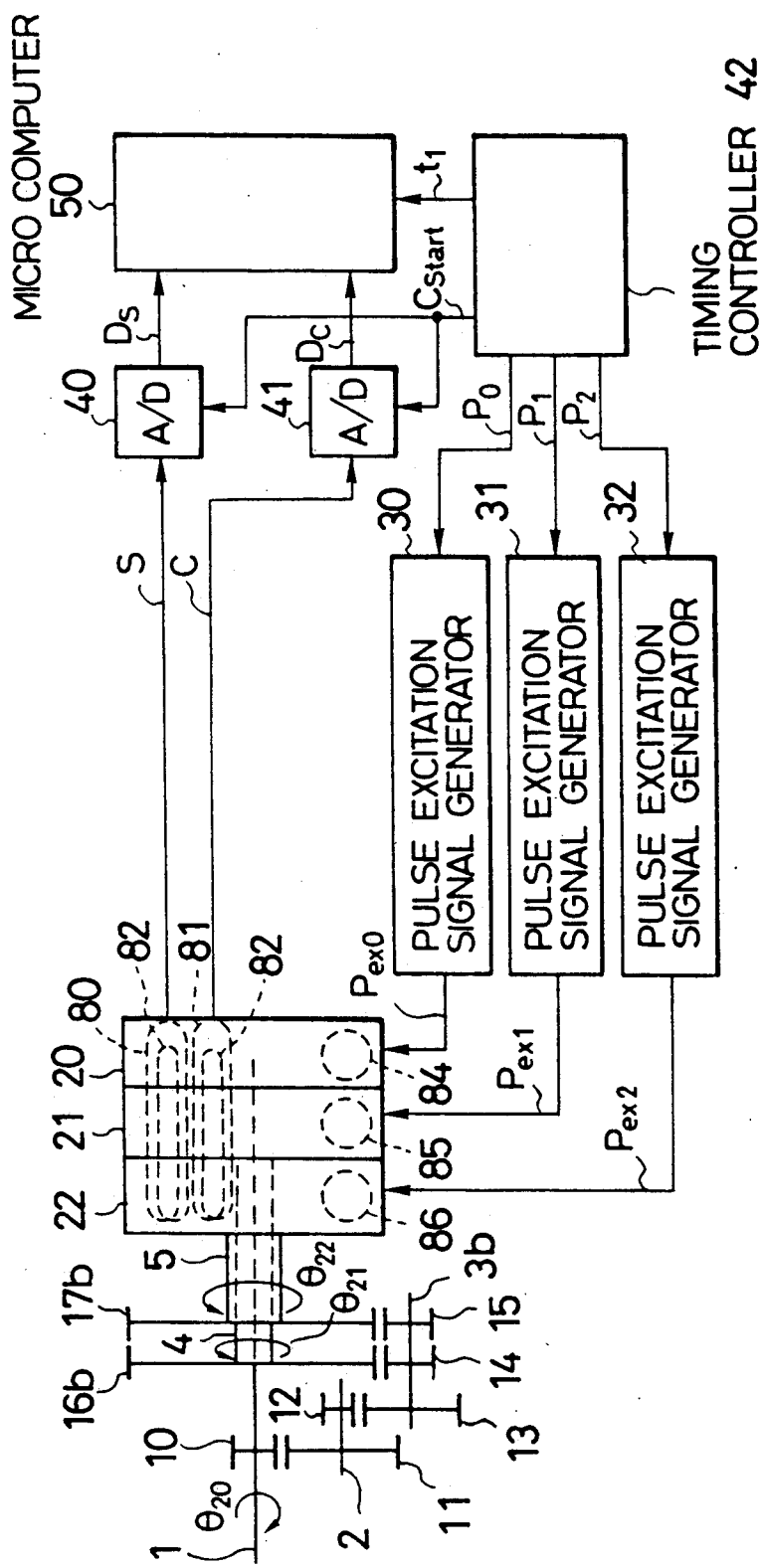
FIG. 2 is a block diagram showing the conventional absolute position detector and an embodiment of its encoding circuit.
Figure 3:
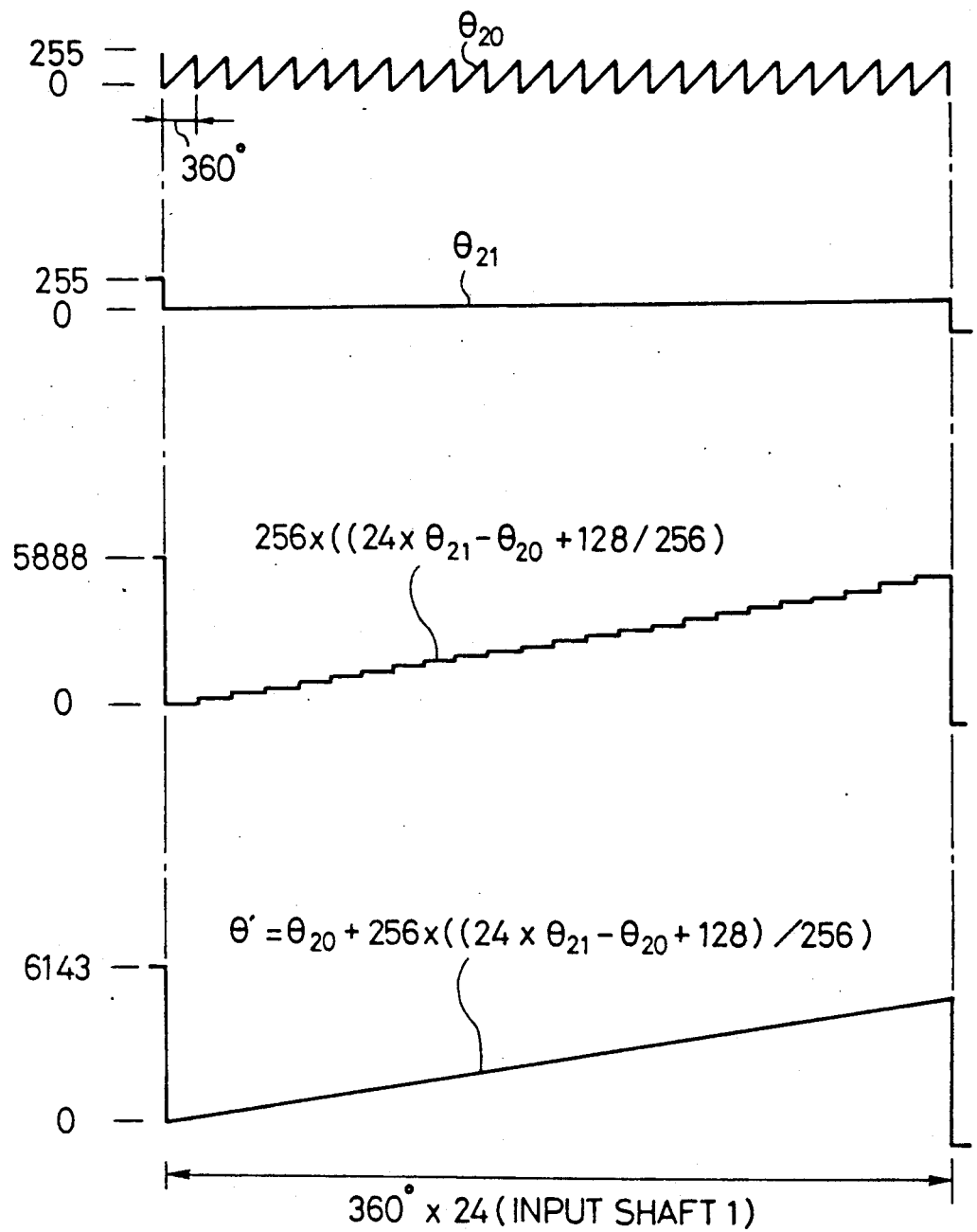
FIGS. 3 and 4 are views explaining respectively computation processes in the conventional absolute position detector.
Figure 4:
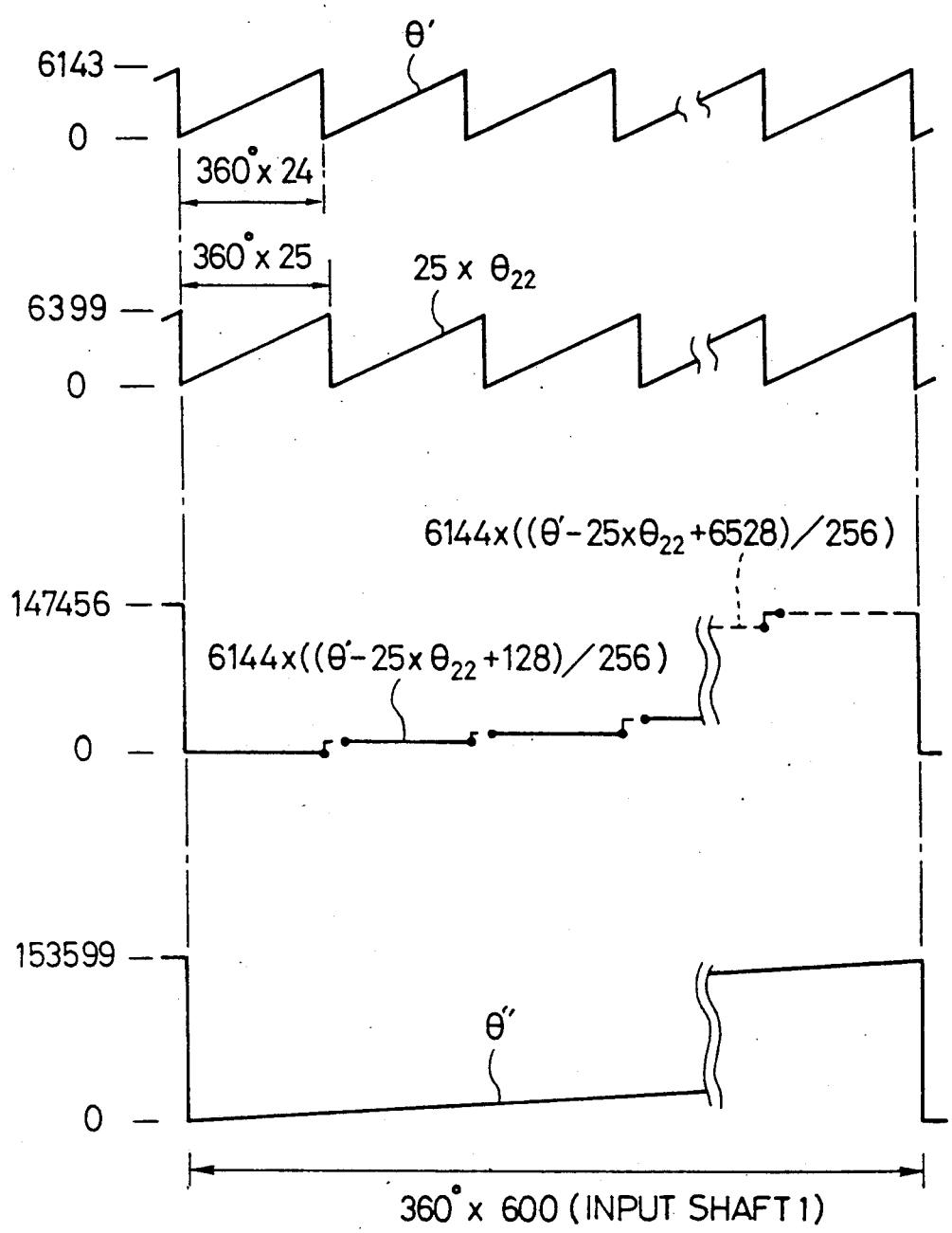
Figure 5A:
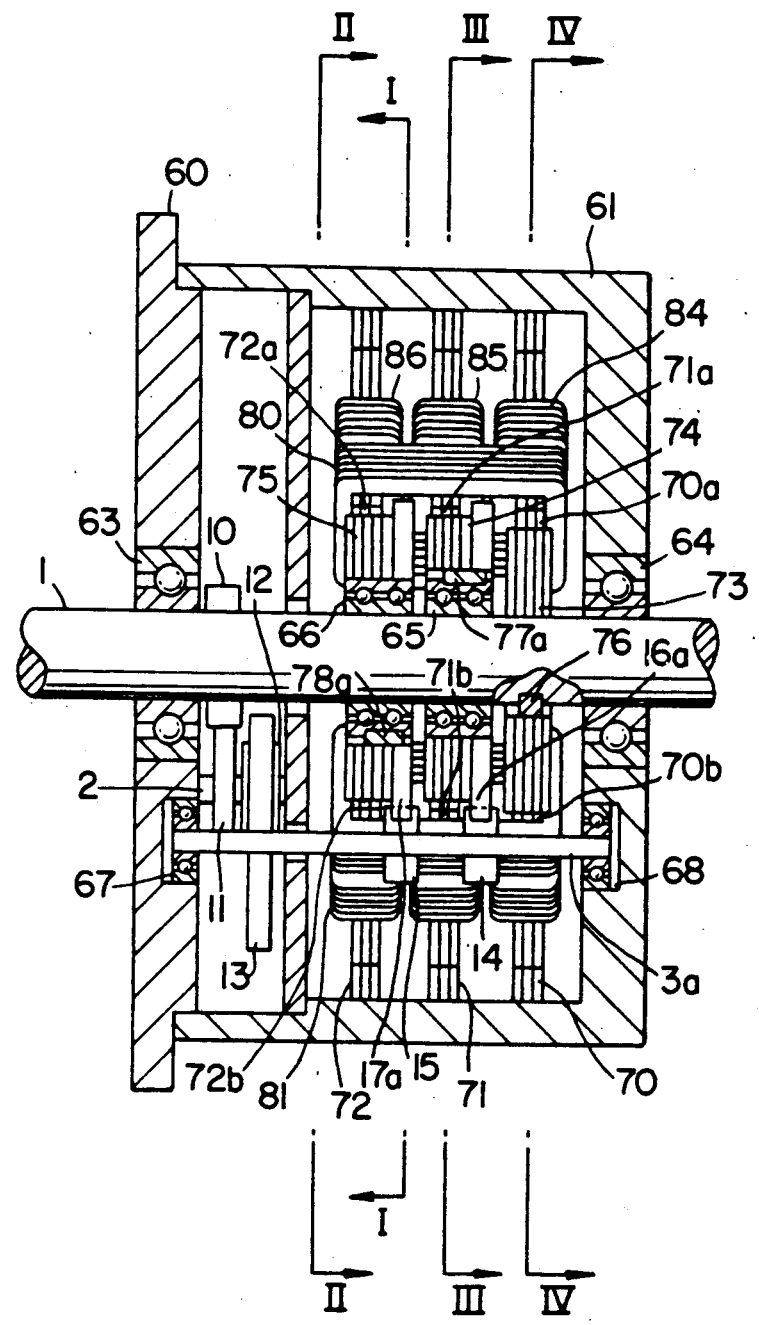
FIG. 5A is an axial cross section view showing an embodiment of an absolute position detector according to the present invention.
Figure 5C:
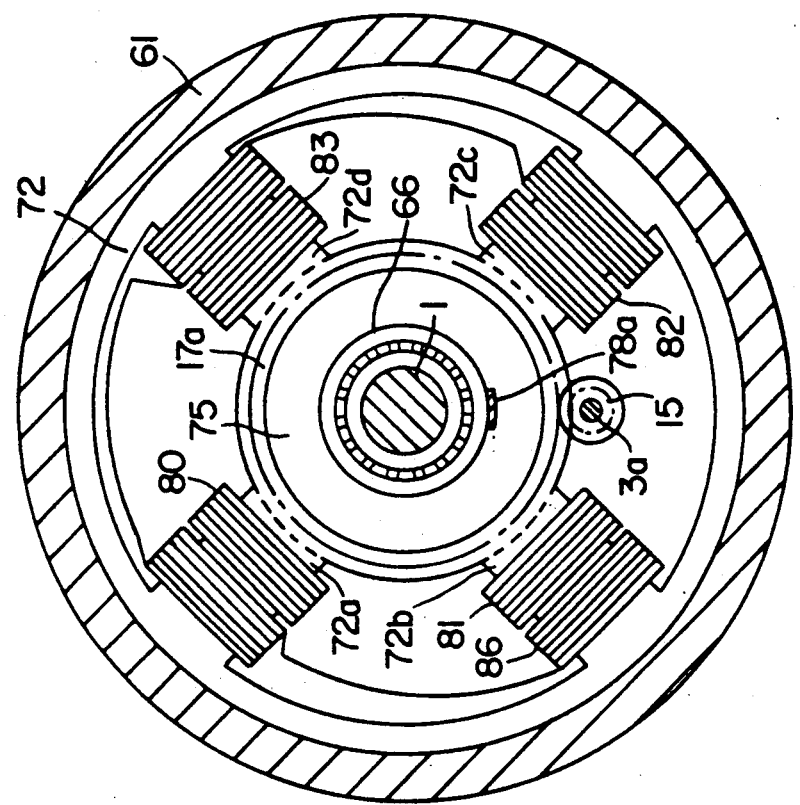
FIG. 5C is a cross section view taken along line II—II of FIG. 5A.
Figure 5B:
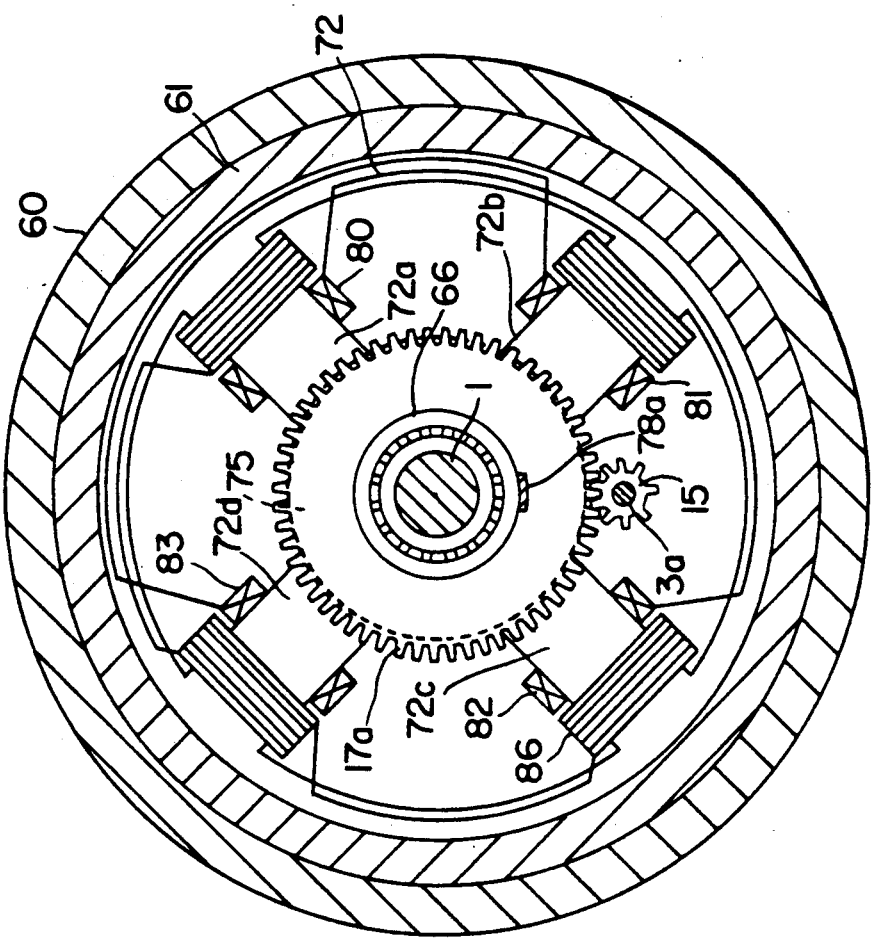
FIG. 5B is a cross section view taken along line I—I of FIG. 5A.
Figure 5E:
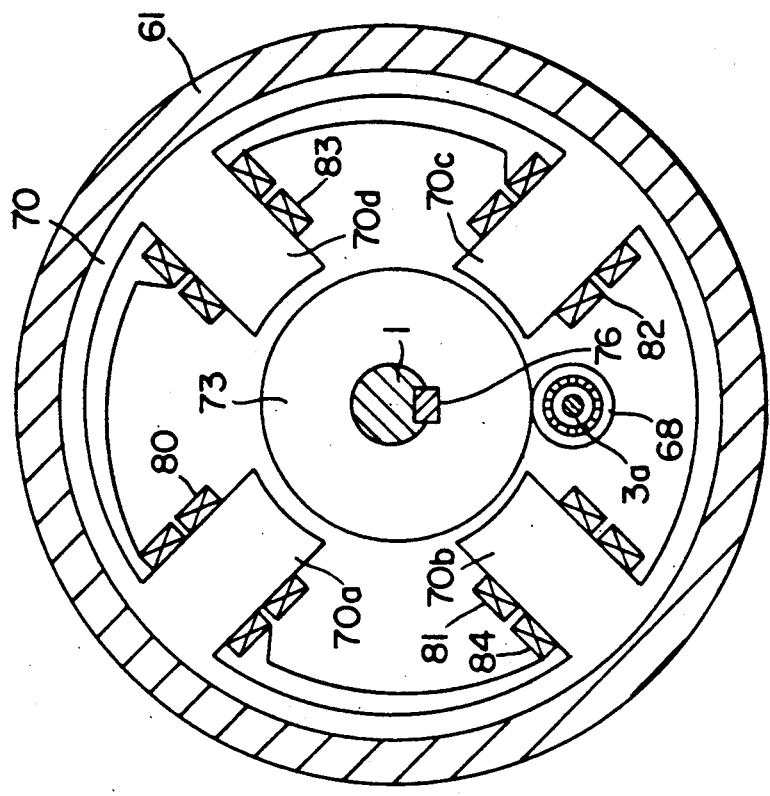
FIG. 5E is a cross section view taken along line IV—IV of FIG. 5A.
Figure 5D:
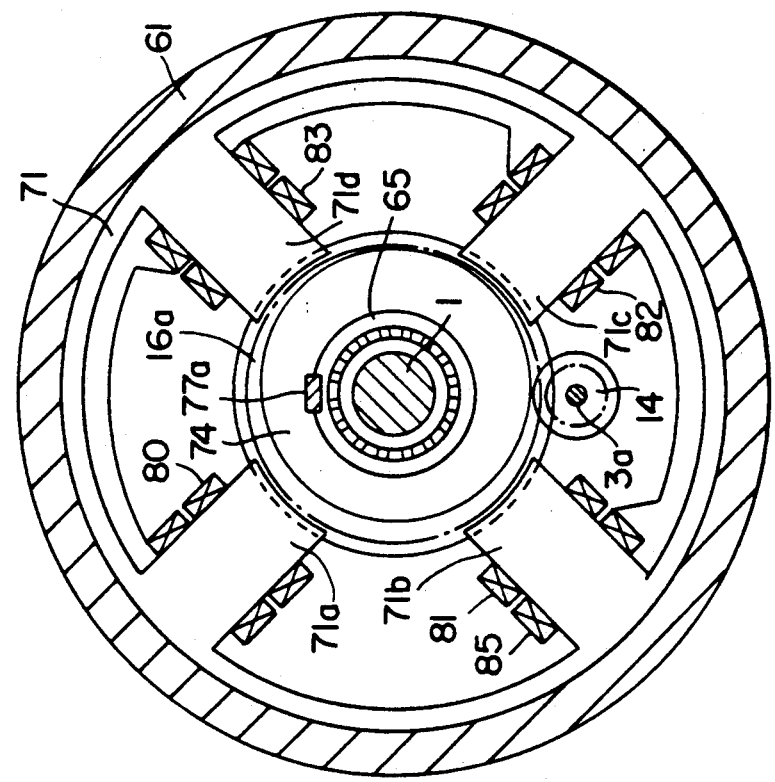
FIG. 5D is a cross section view taken along line III—III of FIG. 5A.

FIGS. 5A through 5E are cross section view showing, in correspondence with FIGS. 1A and 1B, an embodiment of the absolute position detector according to the present invention. The same components in FIGS. 5A and through 5E as those in FIGS. 1A and 1B are denoted by the same reference characters, the explanations thereof being omitted. A shaft 3a of the gear 13 is axially supported by a bearing 67 fitted to the face of the flange 60 and by a bearing 68 fitted to the face of the rotation casing 61. A reduction gear system is provided in such a manner that the rotation of the gear 13 causes the gears 14, 15, which are fitted to the shaft 3a of the gear 13 in the spaces between the pole teeth 70a-70d, 71a-71d and 72a-72d of the stators 70, 71 and 72. The rotation of the gear 13 further causes the rotation of gears 16a, 17a, which are respectively engaged with the gears 14, 15 and are made of a non-magnetic material, such as plastic, brass, or stainless steel. The gear 16a and the rotor 74 and the gear 17a and the rotor 75 are attached with the aid of keys 77a, 78a to bearings 65, 66, which are fitted to the input shaft 1. With the above-described reduction gear system, the rotor 74 rotates one turn for every twenty four rotations of the input shaft 1, while the rotor 75 rotates one turn for every twenty five rotations of the input shaft 1.

In such a construction as that described above, parts of the gears in the reduction gear system can be arranged in the spaces, the spaces being designed to avoid magnetic interference, among the rotors 73, 74, 75 of the resolvers. Further, since the bearing 65, 66 disposed in line make the rotors 74, 75 respectively rotate, the conventional cylindrical output shafts 4, 5 are no longer necessary.

If the shaft 3a of the gear 13 and the gears 14, 15 are arranged so that they come close to the stators 70, 71, 72, it would be desirable that the shaft 3a and the gears 14, 15 be made of the same non-magnetic material as that used for the gears 16a, 17a, to allow for the influence of the magnetic properties of the resolver.

Figure 6:
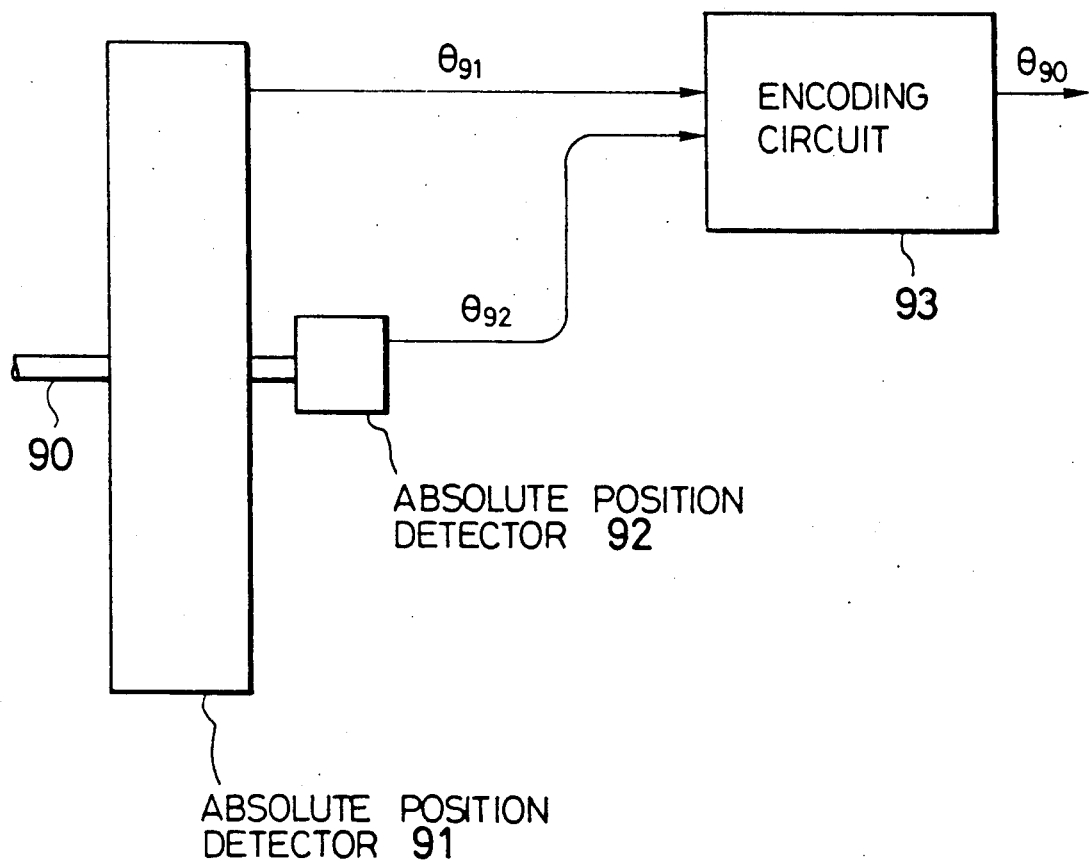
FIG. 6 is a block diagram illustrating an applied embodiment of the absolute position detector in accordance with the present invention.

FIG. 6 is a block diagram showing an applied embodiment of the high resolution and highly precise absolute position detector in accordance with the present invention. The absolute position detector 92 according to the present invention, and a rotary inductosyn detecting up to 1/M rotations or an absolute position detector 91 detecting up to 1/M rotations of a multi-polar resolver, or the like are fitted to the same input shaft 90. Absolute position detecting signals $\theta_{91}$, $\theta_{92}$ from the absolute position detectors 91, 92 are transmitted to an encoding circuit 93 in order to determine and output the absolute position detecting signal $\theta_{90}$ of the input shaft 90.

For example, if the 1/M rotations of the input shaft 90 are represented by the absolute position detecting signal $\theta_{91}$ ranging from 0 to 1023, and if six hundred rotations of the input shaft 90 are represented by the absolute position detecting signal $\theta_{92}$ ranging from 0 to 153599, the absolute position detecting signal $\theta_{90}$ of the input shaft 90 can be obtained by the following equation (4).

$$\theta_{90} = \theta_{91} + 1024 \times ((1024/256 \times M \times \theta_{92} - \theta_{91} + 1024/2)/1024) \quad (4)$$

the above equation (4) is computed using only integers.

The absolute position detecting signal $\theta_{90}$ of the input shaft 90 thus obtained is represented by any number from 0 to (614,400M−1), six hundred rotations of the input shaft 90.

As has been described, it is possible according to the present invention to provide a miniaturized and simply structured absolute position detector at a low cost.

The invention has been described in detail with particular reference to the preferred embodiment thereof, but it will be understood that variations and modifications of the invention can be made within the spirit and scope of the invention.

It should be understood that many modifications and adaptations of the invention will become apparent to those skilled in the art and the present invention is intended to encompass such obvious modifications and changes in the scope of the claims appended hereto.

What is claimed is:

1. An absolute position detector for detecting an absolute position of a rotating shaft, said absolute position detector comprising:
    a rotatable shaft;
    first gearing means for operatively coupling the rotating shaft to said rotatable shaft;
    a plurality of resolvers each comprising a stator portion and rotor portion, said stator portion including a plurality of pole teeth made of a magnetic material and arranged along a circumference of the rotating shaft at a distance from the rotating shaft, said rotor portion including a rotor made of a magnetic material respectively associated with said plurality of pole teeth of said stator portion and located between the rotating shaft and said plurality of pole teeth of said stator portion; and,
    second gearing means for operatively coupling said rotor portion of each of said plurality of resolvers to said rotatable shaft;
    wherein upon a rotation of the rotating shaft, said first gearing means causes said rotatable shaft to rotate, and wherein upon a rotation of said rotatable shaft, said second gearing means causes said rotor of each of said plurality of resolvers to vary a reluctance of a magnetic circuit formed by said pole teeth of an associated stator portion; and,
    wherein said rotatable shaft extends between two of said plurality of pole teeth of said stator portion of each of said plurality of resolvers.

2. An absolute position detector as recited in claim 1, wherein in said second gearing means comprises first and second gears associated with each of said plurality of resolvers, said first gear being disposed around and fixed to said rotatable shaft and having a rotational axis defined by said rotatable shaft, said second gear being disposed around the rotating shaft and having a rotational axis defined by the rotating shaft and having said rotor of an associated resolver fixedly mounted thereto, said first and second gears being made of a non-magnetic material.

3. An absolute position detector for detecting an absolute position of a rotating shaft, said absolute position detector comprising;
    first and second position detecting units, operatively coupled to the rotating shaft, for respectively outputting first and second absolute position signals; and,
    an encoding means, coupled to said first and second position detecting units, for processing said first and second absolute position signals to obtain an absolute position of the rotating shaft;
    wherein at least one of said first and second position detecting units comprises:
    a rotatable shaft;
    first gearing means for operatively coupling the rotating shaft to said rotatable shaft;
    a plurality of resolvers each comprising a stator portion and rotor portion, said stator portion including a plurality of pole teeth made of a magnetic material and arranged along a circumference of the rotating shaft at a distance from the rotating shaft, said rotor portion including a rotor made of a magnetic material respectively associated with said plurality of pole teeth of said stator portion and located between the rotating shaft and said plurality of pole teeth of said stator portion; and,
    second gearing means for operatively coupling said rotor portion of each of said plurality of resolvers to said rotatable shaft;
    wherein upon a rotation of the rotating shaft, said first gearing means causes said rotatable shaft to rotate, and wherein upon a rotation of said rotatable shaft, said second gearing means causes said rotor of each of said plurality of resolvers to vary a reluctance of a magnetic circuit formed by said pole teeth of an associated stator portion; and,
    wherein said rotatable shaft extends between two of said plurality of pole teeth of said stator portion of each of said plurality of resolvers.

* * * * *